May 16, 1967

C. R. ZIMMERMAN 3,319,590

SEED DRILL

Filed July 27, 1964

INVENTOR.
CLARENCE ROBERT ZIMMERMAN
BY
Wells & St. John
ATTYS.

May 16, 1967  C. R. ZIMMERMAN  3,319,590
SEED DRILL
Filed July 27, 1964  5 Sheets-Sheet 2
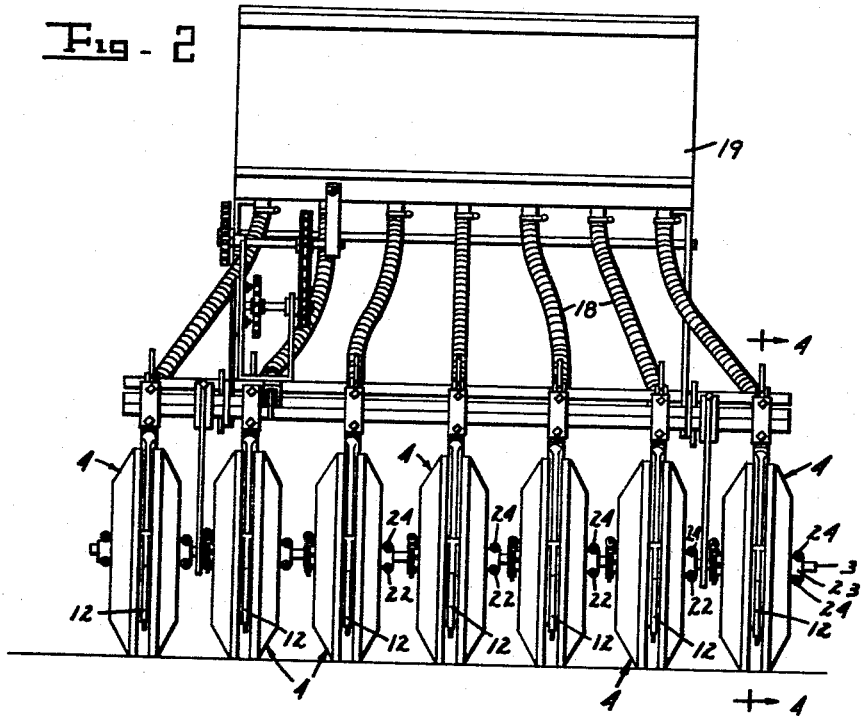
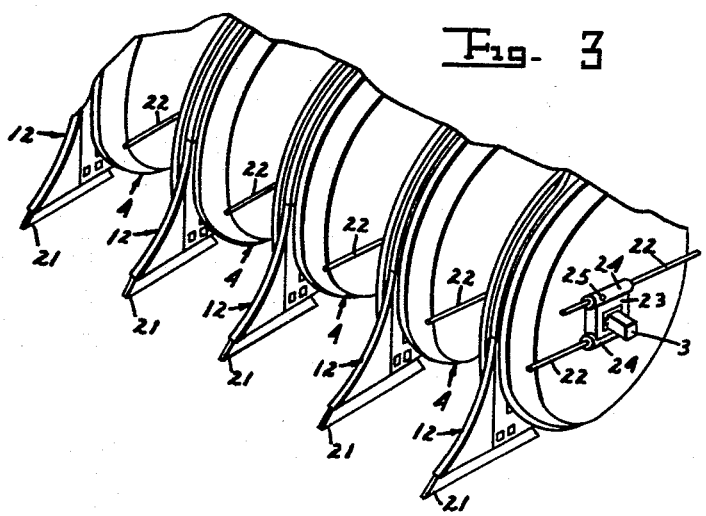
INVENTOR.
CLARENCE ROBERT ZIMMERMAN
ATTYS.

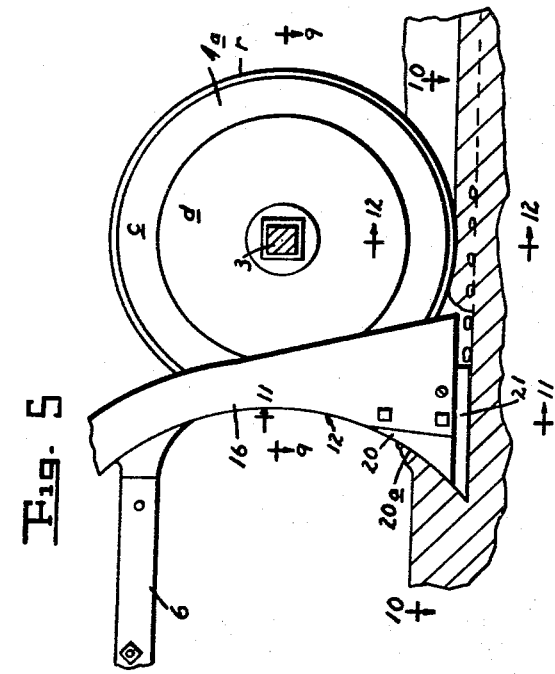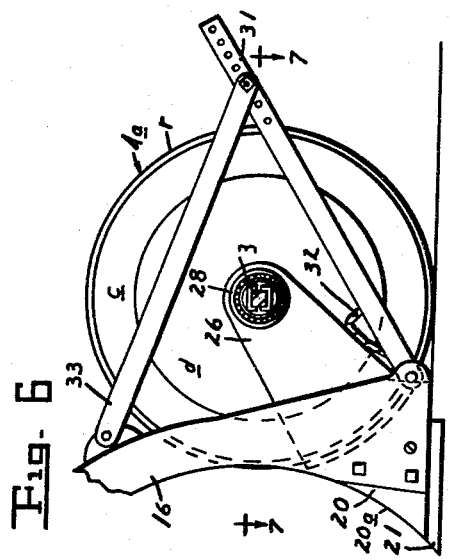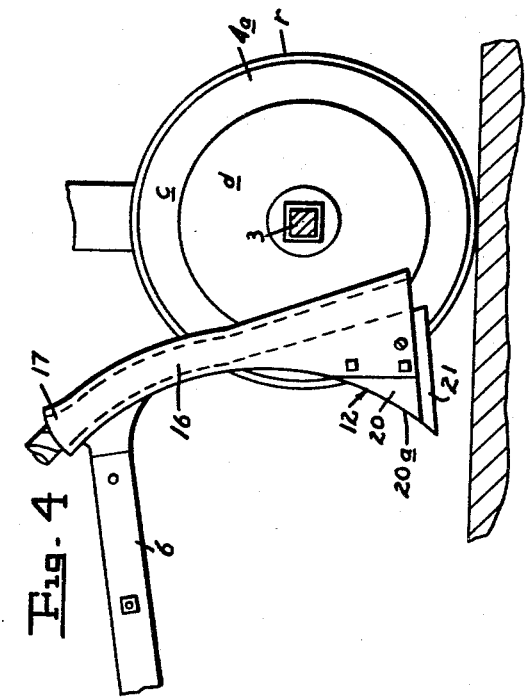

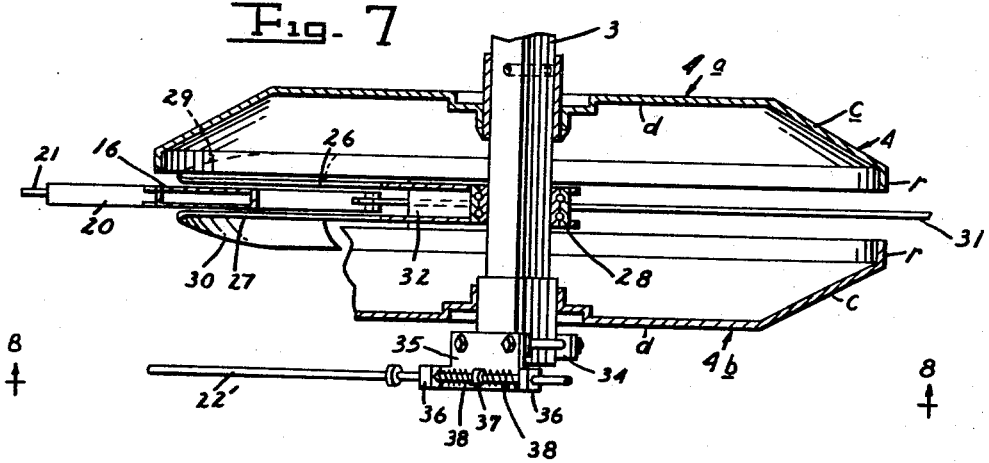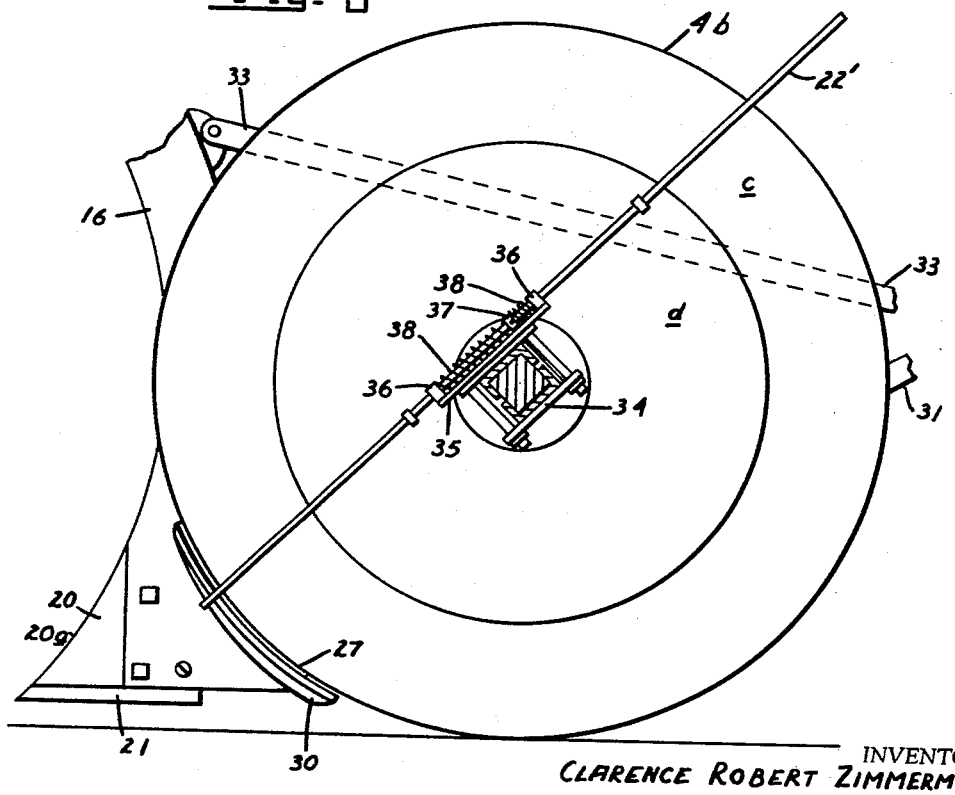

May 16, 1967  C. R. ZIMMERMAN  3,319,590
SEED DRILL

Filed July 27, 1964  5 Sheets-Sheet 5

INVENTOR.
CLARENCE ROBERT ZIMMERMAN
BY
*Wells & St.John*
ATTYS.

3,319,590
SEED DRILL
Clarence Robert Zimmerman, P.O. Box 6,
Almira, Wash. 99103
Filed July 27, 1964, Ser. No. 385,204
6 Claims. (Cl. 111—85)

My invention relates to a seed drill. In order that tne nature of the invention will be more readily understood I will endeavor to set forth, briefly, the problems involved in the seeding of one of the major crops such as wheat. In many areas there are conditions of climate that make the so called winter heat the most satisfactory crop to grow. However, in the dryland winter wheat areas the farmer usually must sow in dry soil, that is, in soil where the top few inches of the soil is quite dry. As pointed out by Donald W. Sunderman in an article in the Agronomy Journal, volume 56, pp. 23-25, the problem of how to get an adequate stand of plants is a difficult one.

The best stand of winter wheat is obtained in the field when the seed is deposited evenly in moist soil at the optimum depth for the variety planted, and, when the warmth of the soil is adequate for the seed to sprout and for the resulting plant to continue growth for some time. In the seeding of winter wheat in much of the drier wheat growing areas it therefore becomes necessary to mulch the soil through the summer to conserve the moisture and to do the planting in early fall. It is very difficult with some of the better producing varieties to get an adequate emergence of the plants but if a good stand is obtained the plants can form permanent strong root systems before the cold weather arrives. One of the best new high yield varieties of wheat, Gaines wheat, in order to sprout requires that the seed be set in moist soil. It is best to have at least ¾ inch moist soil over the seed. With this wheat emergence drops rapidly as the total depth of soil over seed increases. In the article in the Agronomy Journal referred to above, the percent of Gaines plants emerging was reported as dropping from 97.1% at 2 inches depth to 56.2% at 4 inches, when daily temperatures were 62 degrees F. minimum to 81 degrees F. maximum.

At the time for early seeding we have a high rate of evaporation from the soil, sometimes intermittent light showers that cause crusting, and the poorest moisture conditions of the year.

I had found that by providing a shovel type furrow opener to extend down into the soil a depth sufficient to reach into the moist soil and by having a runner blade dig out a slot to receive the seeds and by delivering the seeds immediately behind the blade I could get the seeds into the moisture laden soil to the right depth. However, to make the loose dry mulch above stay away from the seed and to limit the depth of dry soil I employed packer wheels behind the shovel to roll over the inclined walls left by the shovel and pack them. This structure is shown and claimed in my prior application Ser. No. 172,368, filed Jan. 29, 1962, for Seed Drill.

The present invention is an improvement over my prior invention disclosed in application Ser. No. 172,368. The present invention simplifies the furrow opener and enables me to utilize the packer wheels more effectively with the furrow opener to establish optimum control of the depth of moist soil in which the seed is planted and hold the dry soil from falling in on top of the planted seed until it is packed down.

It is the principal purpose of the present invention to provide, in a furrow opener-packer wheel-seed tube combination of a seed drill, means to keep the soil at the sides of the furrow opener away from the ed trench until the packer wheels roll-press this soil laterally and downwardly, thereby maintaining the depth of soil over the seed substantially independent of the depth of penetration of the furrow opener into the soil throughout depth range of soil penetration needed to deposit the seed in moist soil.

It is also a purpose of this invention to provide trash working fingers in combination with the packer wheel-furrow opener assembly operable to drag trash away from the furrow openers and rearwardly between adjacent pairs of packer wheels.

The objects and advantages of this invention will appear more fully from the following description and the accompanying drawings which illustrate a preferred form of the invention and cetrain modifications. It should be understood, however, that the drawings and description are illustrative only and are not intended to limit the scope of the invention except insofar as it is limited by the claims.

In the drawings:

FIGURE 2 is a rear end view of the drill;

FIGURE 3 is a fragmentary perspective view of a plurality of the furrow opener-packer wheel-seed tube assemblies as they appear side by side;

FIGURE 4 is an enlarged fragmentary sectional view taken on the line 4—4 of FIGURE 2;

FIGURE 5 is a view like FIGURE 4 but showing the furrow opener lowered for soil penetration;

FIGURE 6 is a view like FIGURE 4 but showing a modification of the invention with separate pusher means operable to aid in preventing soil from falling between the packer wheels and the furrow opener;

FIGURE 7 is an enlarged sectional view taken on the line 7—7 of FIGURE 6;

FIGURE 8 is a side view looking at FIGURE 7 from the line 8—8;

Figure 1:
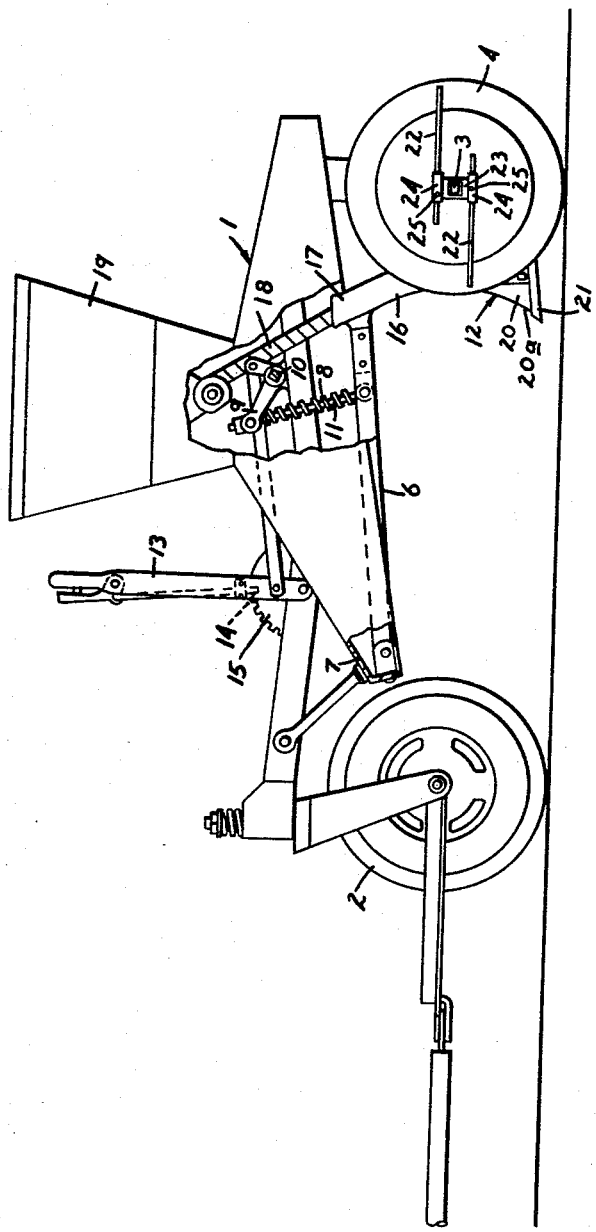
FIGURE 1 is a view in side elevation of a seed drill embodying my invention part of the drill frame being broken away.
Figure 9:
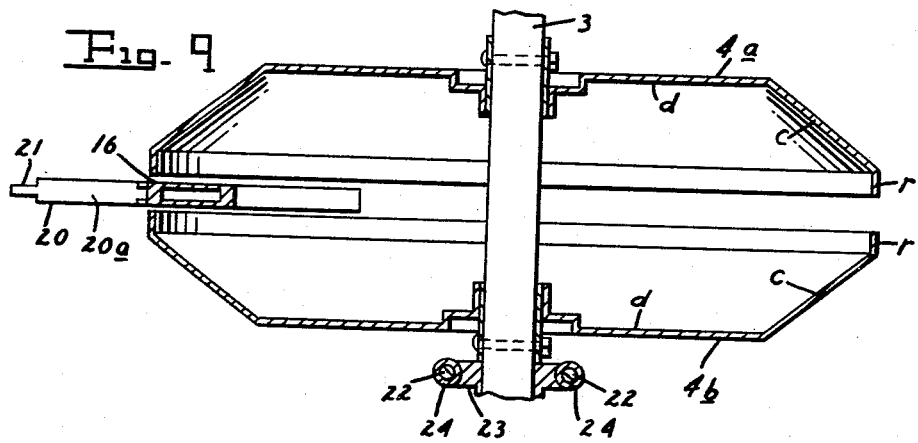
FIGURE 9 is an enlarged sectional view taken on the line 9—9 of FIGURE 5.
Figure 10:
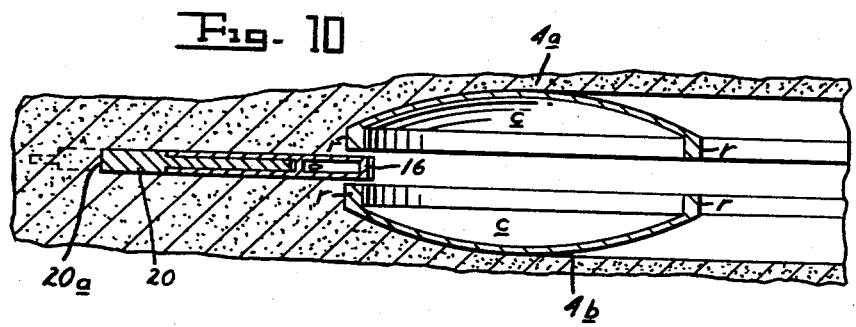
Figure 11:
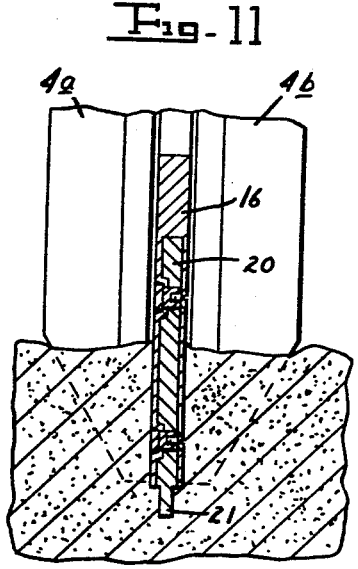
Figure 12:
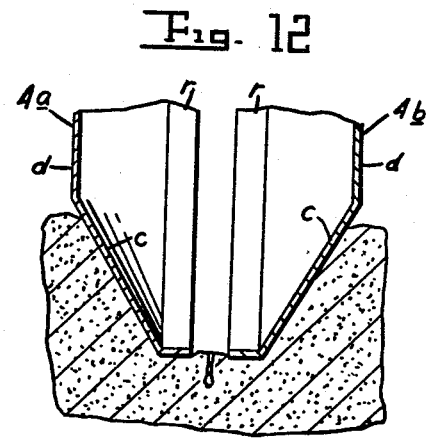

FIGURE 10 is an enlarged sectional view on the line 10—10 of FIGURE 5 showing the soil position as well as the relative positions of the furrow opener and seed tube with respect to the packer wheels, and FIGURES 11 and 12 are enlarged sectional views taken on the lines 11—11 and 12—12 respectively of FIGURE 5 further illustrating how the furrow opener, seed tube and packer wheels cooperate.

Referring now to the drawings, my invention is shown as applied to a seed drill the upper parts of which are of known construction. The drill has a main frame 1 supported at the front by wheels 2. The rear end of the frame 1 is carried upon a shaft 3 which is carried by a plurality of press wheel assemblies 4. Each press wheel assembly comprises two spaced apart disks 4a and 4b. Each disk has a cylindrical rim portion r a conical portion c and a flat center portion d. The portion d is fixed on the shaft 3 to rotate with the shaft.

There is a furrow opener carrying arm 6 in front of each packer wheel assembly 4. These arms have their forward ends pivotally suspended on a cross frame member 7 of the frame 1. The arms 6 extend rearwardly to the vicinity of the press wheel assemblies 4. Intermediate their ends the arms are supported in a known manner by depth adjusting rods 8 that have their upper ends carried by arms 9 on a rock shaft 10. Springs 11 surround the rods 8 between the arms 6 and the arms 9 and each rod is slidable upward through the corresponding arm 9 upon compression of the spring 11. Thus the rod 8 can be used to positively lift the furrow opener arm 6 and the assembly 12 of seed tube and furrow opener to press them down against the opposition of the spring 11. The control of the depth of penetration of the furrow openers into the soil is thus accomplished through the rock shaft 10 which is adjusted by a hand lever 13 with a pawl 14 thereon for locking it in position by engagement with a curved rack 15. This is a known assembly for regulating depth of penetration of a furrow opener. Any means may be used to adjust the shaft 10, the hand lever 13 being merely one example of the mechanisms now used for this purpose.

The assembly 12 includes a rigid seed tube portion 16 having means 17 for receiving a flexible seed tube portion 18 that conducts seeds from a seed hopper 19. A furrow opener 20 is secured to the seed tube portion 16 and has a front face 20a that curves forwardly toward its lower end. It will be noted that the opener 20 and the seed tube portion 16 fill the space from the front face 20a of the opener back to the press wheel disks 4a and 4b and that the seed tube portion 16 extends between these disks throughout most of its length. At the level of the shaft 3 the front surface of the seed tube is about even with the front of the rim portions r. The furrow opener front face 20a meets the seed tube front face to make a smooth joint. The furrow opener 20 is bolted to the seed tube 16 and together they provide a wall means to hold the soil back until the packer wheel disks 4a and 4b can push the adjacent soil down and out to make packed sloping walls for the seed trench.

The furrow opener 20 carries a trenching blade 21 at it slower edge, the blade 21 having a front nose portion 21a that projects forwardly and downwardly as a continuation of the center portion of the furrow opener surface 20a. This blade is about an inch deep and its thickness is about equal to the seed tube opening at the bottom of the portion 16. The blade 21 extends back to the front of the seed tube so as to keep a trench open to receive the seeds. With this assembly the seeds are delivered into the trench formed by the blade 21 and all top soil is kept out until the press wheel disks can apply their pressure.

The furrow opener depth is adjusted to penetrate to soil that is fairly moist. The soil that is lifted by the front face of the furrow opener falls to both sides and thus even where there is a considerable depth of dry top soil, some moist soil is brought up by the furrow opener. This moist soil is helpful in holding the sloping side walls when they are formed by the downward and outward pressure of the portions r and c of the press wheel disks 4a and 4b.

The seeds deposited in the trench formed by the blade 21 is covered with soil by the caving inward of the soil at the sides when the press wheels are compacting the slopes. The soil directly over the seeds is not packed and it is primarily moist soil that is caved in around the seeds.

The assembly of seed tube, furrow opener and press wheels just described appears to work through straw and other surface trash because the trash that is lifted by the furrow opener rides up to where the press wheels engage it and their rolling motion pulls the trash to the sides. I also provide trash engaging fingers 22 alongside each one of the press wheel disks 4a and 4b. These fingers 22 are shown in pairs and each pair is mounted on a hub 23 which is affixed to the shaft 3 in juxtaposition to the disk. The hub 23 has a pair of sleeves 24 thereon in which the fingers are removably secured in any suitable manner as by set screws 25. The length of the fingers 22 preferably is such that their free ends extend radially a distance from the shaft 3 equal to the radial distance from the shaft 3 to the run r of the disk 4a or 4b. The fingers stick into thick trash and pass it rearwardly between the press wheel assemblies 4.

The modification shown in FIGURE 6 provides a means to assist the disks 4a and 4b in pushing the soil aside after the furrow opener has opened up the seed trench. This means comprises a pair of plates 26 and 27 mounted on a hub 28 that is rotatably mounted on the shaft 3 between each pair of press wheels 4a and 4b. These plates 26 and 27 extend forwardly and downwardly and have sufficient depth to block the soil away from the tube portion 16 and protect this portion from wear by the rotating runs r of the press wheel disks 4a and 4b. The front ends of the plates 26 and 27 are turned out and back as shown at 29 and 30. The portions 29 and 30 push the soil laterally and furthermore keep moist soil from building up on the runs r of the press wheel disks.

I prefer to provide for depth adjustment of the pushing means 26–30 with the depth adjustment of the furrow opener-seed tube assembly. To do this I pivot a bar 31 to the rear lower corner of the seed tube portion 16 and mount a cam 32 on the bar. The rear end of the bar is connected by a link 33 extending from the bar 31 up to the upper part of the portion 16. By adjusting the link on the bar the pusher means can be raised or lowered with respect to the furrow opener. Normally the pusher means 26–30 is adjusted to put the lower ends of the portions 29 and 30 at or slightly above the level of the furrow opener. The blade 21 extends below this level and forms the trench for the seed. If deeper covering is desired the pusher means is raised so that there is more soil left under the rims of the press wheels for them to pack down.

A modified form of trash fingers 22′ is illustrated in FIGURES 7 and 8. Here a clamp 34 is placed on the shaft 3. It carries a plate 35 which has two sleeves 36 through which the finger rod 22′ runs. The rod 22′ has a center collar 37 fixed thereon and springs 38 between the collar 37 and the sleeves 36 yieldingly hold the rod 22′ centered but allow a limited endwise movement of it as it engages the soil.

For early spring planting the furrow openers are adjusted to place the seed three or four inches below the top level of the soil. The soil is pushed back by the press wheels and the slopes of the furrow are packed by the press wheels. However in the bottom of this furrow the seed is covered only the desired amount of about an inch and the soil is loose, not packed, over the seed groove.

In dry fall planting the furrow opener must be adjusted to go deeper and follow the moisture level. Here again the furrow sides are packed by the press wheels and down in the bottom of the deeper furrow the seeds are in moisture with unpacked moist soil covering them. The dry top soil is pushed aside and packed so it will not slide down and cover the seeds too deep for emergence. Where the pusher means is used even more exact depth control can be had because this pusher means scrapes any loose dirt to the sides and lets the press wheels follow to the exact depth desired. The seed is placed in moisture, the soil over it is not packed down. The sun can warm the shallow depth of soil over the seed. It has long been known that planting seeds in the bottom of a furrow is helpful in retaining moisture to sprout the seeds. However, with my invention it is possible for the first time to take full advantage of this fact and get proper depth planting and pack the sloping sides of the furrow while firming the seeds around the soil by the caving in of the sides of the seed trench and not packing the soil directly over the seeds.

Having described my invention, I claim:

1. In a seed drill having a main frame and a seed hopper on said frame, a seed depositing assembly operable to deliver seeds from said hopper into the soil, said assembly comprising;

a seed delivery tube including an upper tube portion connected to the hopper and a lower rigid tube portion receiving seeds from the upper portion and providing a seed passage open at its lower end;

a furrow opener mounted on the front of said lower tube portion and having sides adjoining the lower tube portion at its side surfaces and forming forward continuations of said side surfaces;

said opener having a soil penetrating point spaced forwardly from the lower end of said lower tube portion, and its front edge inclined upwardly and rearwardly from the point to the lower rigid tube portion;

a press wheel shaft below and connected to said main frame;

a pair of press wheel disks on said shaft having substantially circular rims spaced apart with said lower seed tube portion extending between the rims along the front thereof and in juxtaposition to the rim edges, substantially to block soil at the sides of the opener from flowing together or entering the space between said disks;

said disks having generally conical portions extending outwardly from the rim portions toward the disk shaft and operable together to press the soil separated by said opener sides into sloping compacted side walls on the furrow;

the opener having a seed trench forming blade along the bottom thereof the front end of which forms a continuation, at reduced width, of said point of the furrow opener, the blade terminating in front of the lower end of said seed passage, whereby to keep a trench open for deposit of the seed.

2. The invention defined in claim 1 wherein the lower seed tube portion has its portion immediately above the furrow opener substantially entirely between the rims of said disks.

3. The invention defined in claim 1 with fingers outside the disks extending from near the rims thereof inward and connected with the disks to rotate in the same direction as the disks.

4. The invention defined in claim 1 with pusher means interposed between the disks, pivoted on said shaft and extending forward therefrom between the rims and the lower seed tube portion operable to push soil away from the space between the rims.

5. The invention defined in claim 1 wherein a pair of plates are interposed between the rims of the disks and the lower seed tube portion and pivotally mounted on the shaft the plates having turned out pushers in front of the rims and juxtaposed thereto operable to push soil outwardly and prevent soil build up on the rims.

6. The invention defined in claim 1 wherein a hub is fixed on the shaft alongside each of said disks and a pair of trash fingers are mounted on each hub and extend out to the rims of the disks.

References Cited by the Examiner

UNITED STATES PATENTS

| | | | |
|---|---|---|---|
| 1,416,331 | 5/1922 | Campbell | 111—87 X |
| 2,881,721 | 4/1959 | Hyland et al. | 111—87 X |
| 3,177,830 | 4/1965 | Zimmerman | 111—85 |
| 3,180,291 | 4/1965 | Loomans | 111—85 |

ABRAHAM G. STONE, *Primary Examiner.*

J. R. OAKS, *Assistant Examiner.*